(12) United States Patent
Stefanopoulou et al.

(10) Patent No.: US 6,186,124 B1
(45) Date of Patent: Feb. 13, 2001

(54) SYSTEM & METHOD FOR CONTROLLING CAMSHAFT TIMING, AIR/FUEL RATIO, AND THROTTLE POSITION IN AN AUTOMOTIVE INTERNAL COMBUSTION ENGINE

(75) Inventors: Anna Stefanopoulou, Ann Arbor; Mrdjan J Jankovic, Birmingham, both of MI (US)

(73) Assignee: Ford Global Technologies, Inc., Dearborn, MI (US)

(*) Notice: Under 35 U.S.C. 154(b), the term of this patent shall be extended for 0 days.

(21) Appl. No.: 09/302,539

(22) Filed: Apr. 30, 1999

Related U.S. Application Data

(62) Division of application No. 09/005,571, filed on Jan. 12, 1998, now Pat. No. 6,006,725.

(51) Int. Cl.[7] .................................................. F02M 51/00
(52) U.S. Cl. .......................... 123/492; 123/399; 123/322
(58) Field of Search ..................................... 123/321, 322, 123/492, 399, 90.15, 90.16, 90.17, 90.18

(56) References Cited

U.S. PATENT DOCUMENTS

| 5,101,786 | * | 4/1992 | Kamio et al. ......................... 123/399 |
| 5,143,037 | * | 9/1992 | Swamoto ........................... 123/90.16 |
| 5,168,851 | * | 12/1992 | Itoyama et al. ....................... 123/399 |
| 5,199,403 | * | 4/1993 | Akazaki et al. ................... 123/90.13 |
| 5,220,904 | * | 6/1993 | Miyashita et al. ................ 123/90.16 |
| 5,724,927 | * | 3/1998 | Suzuki ............................... 123/90.15 |
| 6,000,375 | * | 12/1999 | Isobe .................................... 123/399 |
| 6,006,707 | * | 12/1999 | Ito ..................................... 123/90.17 |
| 6,062,201 | * | 5/2000 | Nozawa et al. .................... 123/90.16 |

* cited by examiner

*Primary Examiner*—Erick Solis
(74) *Attorney, Agent, or Firm*—Jerome R. Drouillard

(57) ABSTRACT

A system for controlling camshaft timing, air/fuel ratio and electronic throttle position in an automotive internal combustion engine uses a controller for operating a camshaft phaser, electronic throttle positioner and fuel injectors. The controller determines camshaft timing, steady-state electronic throttle position, steady-state fuel supply, and compensatory transient electronic throttle position, and transient fuel supply such that an engine operating with the present system has the torque output characteristics matching a conventional engine having fixed camshaft timing, but with lower fuel consumption and lower exhaust emissions than a conventional engine.

7 Claims, 2 Drawing Sheets

SYSTEM & METHOD FOR CONTROLLING CAMSHAFT TIMING, AIR/FUEL RATIO, AND THROTTLE POSITION IN AN AUTOMOTIVE INTERNAL COMBUSTION ENGINE

This application is a divisional of Ser. No. 09/005,571, filed Jan. 12, 1998, now U.S. Pat. No. 6,006,725.

FIELD OF THE INVENTION

The present invention relates to a system and method for simultaneously controlling transient camshaft timing, air/fuel ratio, and electronic throttle position in an internal combustion engine.

BACKGROUND OF THE INVENTION

Lean-burn operation of spark-ignited internal combustion engines is desirable because it improves fuel economy. By combining lean-burn and variable cam timing (VCT) technologies in port fuel injected engines, improvement in fuel economy of about 8 to 10% can be achieved. Moreover, available data suggest that the feedgas emissions of a lean-burn VCT engine are also improved. As used herein, the term "feedgas" means the exhaust gas leaving the engine prior to any aftertreatment. And, the term VCT refers to engine cylinder valve timing control of either intake and exhaust valves or only exhaust valves.

Additional improvement in efficiency is possible by operating a direct injection spark-ignited (DISI) engine in a very lean stratified-charge mode. The present invention addresses the problem of scheduling camshaft timing, air/fuel ratio, and electronic throttle position for lead operation of both port-injection and DISI engines in order to achieve optimum performance in terms of fuel efficiency and emissions as well as the driveability or torque response of a conventional engine.

For the purposes of this specification, it is assumed that the engine is equipped with an electronic throttle control (ETC) in which the vehicle driver merely operates a potentiometer, with the actual throttle opening being determined by the engine's electronic controller. Other sensors and actuators used with conventional electronically controlled engines may be employed with a system and method according to the present invention. Performance of the present system during lean operation may benefit from a universal exhaust gas oxygen (UEGO) sensor used instead of or in conjunction with a heated exhaust gas oxygen (HEGO) sensor.

The additional degrees of freedom available in a lean-burn VCT engine make the scheduling of camshaft timing, air/fuel ratio, and electronic throttle position difficult. The method proposed in this specification is structured to decouple driveability issues from the steady sate scheduling of the ETC, camshaft timing and air/fuel ratio. The optimal steady state schedules are obtained using the engine data of fuel consumption and HC, CO, and $NO_x$ emissions at different cam and air-fuel values with engine speed and braking torque held constant. Demanded torque at a given engine speed can be achieved by many different combinations of throttle position, camshaft timing, and air/fuel ratio. The present system and method assures that, at a given torque demand, the steady state values of camshaft timing and air/fuel ratio are optimal.

Transient operation of the ETC, the air/fuel ratio and camshaft timing must be carefully managed in order to achieve torque response resembling a conventional engine. Because the ETC (as an actuator) and fuel injectors are much faster than the cam timing actuator, the following sequence is employed for scheduling and dynamic transient compensation: (a) cam timing command is as prescribed by optimal steady state schedules; (b) the ETC command contains a component which is used to compensate for the cylinder air-charge variation due to cam timing transients; and (c) the air/fuel ratio command contains a dynamic component that matches the manifold filling dynamics to avoid large torque excursions and driveability problems. In general, when valve timing is moved from a more retarded position to a more advanced position, the ETC must be placed in a more closed position; conversely, when valve timing is moved from a more advanced position to a more retarded position, the ETC must be placed in a more open position.

One distinct feature of the proposed method is that the air/fuel scheduling into the lead region is air-driven not fuel-driven. This makes the task of simulating the driveability of a conventional engine much easier because engine output torque is much more sensitive to fuel changes at constant air than to air changes at constant fuel. For example, for a fixed flow of fuel, changing the air flow from 20:1 lean to stoichiometric changes the engine torque by about 6% to 8% as this only changes the efficiency of the engine. On the other hand, for a fixed air flow, changing the fuel flow from 20:1 lean to stoichiometric changes the torque by more than 30%.

To meet legislated tailpipe emission requirements, lean-burn engines must be equipped with a "lean $NO_x$ trap" (LNT) to reduce the exhaust concentration of the oxides of nitrogen ($NO_x$). The LNT requires periodic purging, which is accomplished by operating the engine at either exact stoichiometry or at a rich air/fuel ratio for a period of time. Changing the amount of fuel from lean to rich operation causes an increase in torque which is not demanded by the driver, resulting in driveability problems. The present air-driven method of operation avoids this problem and allows purging of an LNT without causing torque variation.

During stratified operation of DISI engines the problem of fuel-driven air-fuel control is even more pronounced and the benefits of the present air-driven scheduling is more significant.

SUMMARY OF THE INVENTION

According to the present invention, a system for controlling the camshaft timing, air/fuel ratio, and electronic throttle position in an automotive internal combustion engine includes a camshaft phaser for controlling the timing advance of a camshaft for operating cylinder intake and exhaust valves of the engine, a throttle position sensor for sensing the position of a manually operable accelerator and for producing an accelerator position signal, and an engine speed sensor for sensing engine speed and for producing an engine speed signal. The present system also includes an electronic throttle positioner for setting an intake air throttle at a commanded position, a plurality of fuel injectors for supplying fuel to the engine, and a controller for operating the camshaft phaser, the electronic throttle positioner, and the fuel injectors, with the controller receiving the outputs of the accelerator position and engine speed sensors, and with the controller determining camshaft timing advance, steady-state and transient electronic throttle position, and fuel supply.

According to another aspect of the present invention, the controller determines an ETC setting appropriate to achieve a rich air/fuel ratio suitable for purging a lean $NO_x$ trap based upon a quantity of fuel suitable for operating the engine at approximately a stoichiometric air/fuel ratio, but with excess air sufficient to cause enleanment of the air and fuel mixture.

The engine controller of the present system operates the engine with improved fuel economy by operating the fuel injectors to provide a quantity of fuel suitable for operation at approximately a stoichiometric air/fuel ratio, but with the camshaft phaser and the electronic throttle being operated so as to provide an air charge having sufficient mass so as to operate with a lean air/fuel ratio. This is essential to a fuel-driven operating system, rather than the air-driven systems found in the prior art.

The engine controller determines the transient electronic throttle position as a function of at least the time rate of change of the camshaft timing, and preferably, the instantaneous pressure within the engine's inlet manifold.

According to another aspect of the present invention, a method for controlling the camshaft timing, air/fuel ration, and electronic throttle position in an automotive internal combustion engine comprises the steps of determining camshaft timing advance value for a camshaft which operates cylinder intake and exhaust valves of the engine, determining a steady-state position for an electronic air throttle, determining a steady-state fuel supply rate, and determining transient values for electronic air throttle position, and fuel supply rate appropriate to migrate to a desired rich or lean air/fuel ratio while allowing engine torque output to closely approximate the torque output of the engine without camshaft timing control.

The camshaft timing advance and steady-state air/fuel ratio are preferably based upon a sensed operating position of a manually operable accelerator, as well as upon sensed engine speed.

The present method may further comprise the step of determining a rich air/fuel ratio suitable for purging a lean $NO_x$ trap based upon a quantity of fuel suitable for operating the engine at approximately a stoichiometric air/fuel ratio, but with a reduction in air sufficient to cause enrichment of the air and fuel mixture. And, the present method may further include the step of determining a lean air/fuel ratio for operating the engine with increased fuel economy, followed by operation of fuel injectors so as to provide a quantity of fuel suitable for operation at approximately a stoichiometric air/fuel ratio, but with said camshaft phaser and said electronic throttle being operated so as to provide a sufficient air charge so as to operate with a lean air/fuel ratio.

According to another aspect of the present invention, transient air/fuel ratio is determined so as to track and follow the filling and emptying of the intake manifold, with the result that fluctuations in output torque are minimized.

DETAILED DESCRIPTION OF PREFERRED EMBODIMENTS

In order to operate an engine according to the present invention, it is necessary to know throttle position, as governed by an ETC, camshaft operating position (also described as camshaft timing), and fuel injector pulse width. Of course, knowing fuel injector pulse width and the operating characteristics of the camshaft and electronic throttle, the air/fuel ratio can be set to the desired rich, lean, or stoichiometric point. In this manner the engine may be operated to achieve the best emissions and fuel economy with a torque response which is the same as a conventional engine operating at the stoichiometric air/fuel ratio and fixed camshaft timing.

Figure 1:
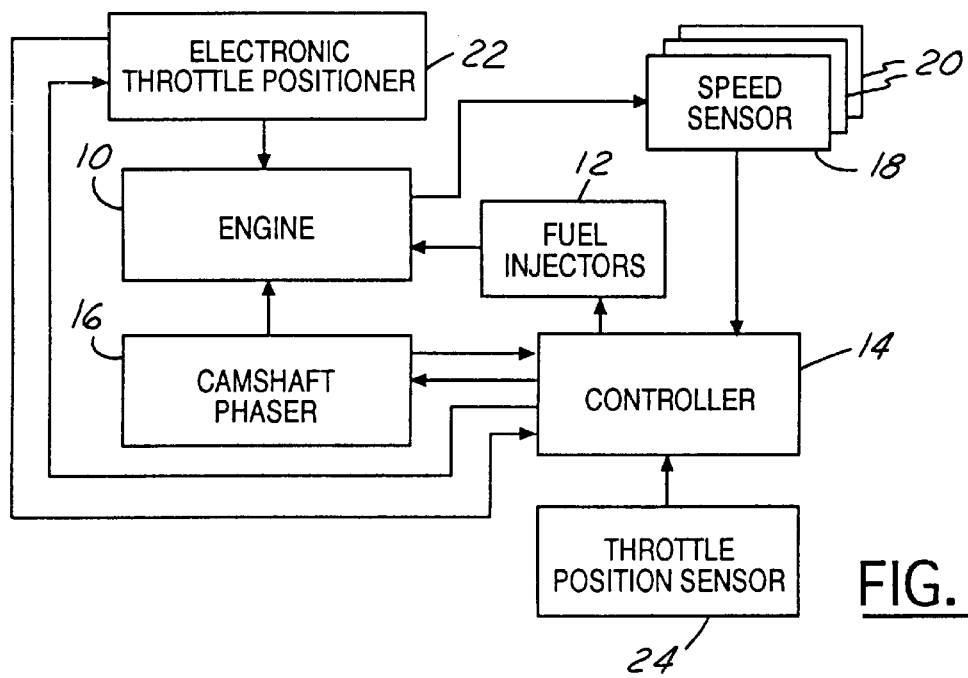
FIG. 1 is a schematic representation of an engine having a control system according to the present invention.

FIG. 1 illustrates an engine having a system according to the present invention. Engine 10 is provided with fuel by means of fuel injectors 12 which are operated by engine controller 14. Engine controller 14 is of the conventional variety known to those skilled in the art and as suggested by this disclosure. Controller 14 also operates camshaft phaser 16 which controls the timing advance of a camshaft which operates the cylinder valves of engine 10.

Controller 14 receives an engine speed signal from speed sensor 18 as well as a variety of other engine operating parameters from sensor 20, which include such sensors as an intake manifold pressure sensor and other sensors known to those skilled in the art and suggested by this disclosure. A system according to the present invention further utilizes electronic throttle positioner 22 which in effect provides a drive-by-wire because the intake air throttle (not shown) is set at a position commanded solely by controller 14; throttle position sensor 24 merely senses or measures the position of a manually operable accelerator and produces an accelerator position signal. In other words, the vehicle operator has no direct link with the air throttle admitting air to the engine's intake manifold.

Figure 2:
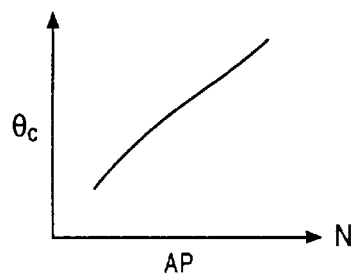
FIG. 2 is a plot of electronic throttle position as a function of accelerator position.

FIG. 2 illustrates a plot of accelerator position AP versus electronic throttle command $\theta_c$. This is a calibratable function which will give progressivity to the vehicle driver's accelerator command according to the dictates of an engineer doing development work on a vehicle having an engine and system according to the present invention. In other words, the greater the slope of the plot, the more aggressively electronic throttle positioner 22 will open the air throttle and in response the driver's input. Simply state, $\theta_c$ is a measure of the torque response demanded by the driver because the more aggressively the driver depresses the accelerator pedal, the greater the driver's expectation of engine response.

Figures 3A, 3B:
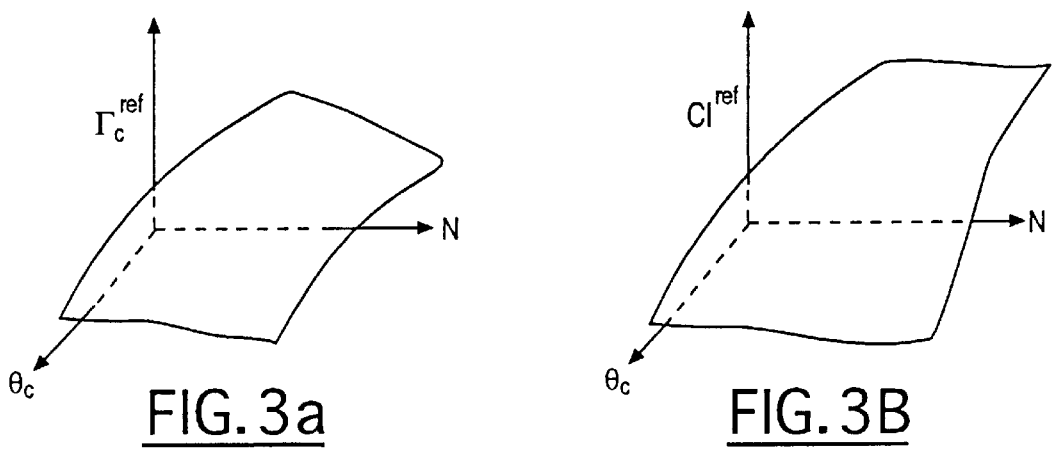
FIG. 3a is a plot of camshaft position as a function of engine speed and electronic throttle position.
FIG. 3b is a plot of air/fuel ratio as a function of engine speed and electronic throttle position.

Having received a value $\theta_c$ from the plot of FIG. 2, which can be merely a lookup table within controller 14, the engine controller moves to FIGS. 3a and 3b, which is a three-dimensional plot, again in the form of a lookup table having as independent variables $\theta_c$ from FIG. 2, and engine speed, N. The plots of FIGS. 3a and 3b, which are determined from engine mapping data, give camshaft position $\Gamma^{ref}$ as well as air/fuel ration, $\alpha^{ref}$. The camshaft timing and air/fuel ratio selected from three-dimensional lookup tables by controller 14 at this step provide the camshaft timing and air/fuel required to achieve optimal emissions and fuel economy at the driver's demanded torque. This is the torque generated at the given accelerator pedal position and engine speed by an engine operating with fixed camshaft timing and a stoichiometric air/fuel ratio.

It is noted here that the camshaft position and air/fuel ratio vary to provide the best emission control capability. These are optimal steady state values dependent on engine speed and torque.

Knowing the steady-state camshaft position and air/fuel ratio, it is still necessary to determine the required throttle position and fuel injector pulse width.

To calculate the fuel charge required at stoichiometry, one need merely take the cylinder air charge and divide by 14.64, which is the chemically correct air/fuel ratio for a typical gasoline motor fuel. Thus, having determined the desired fuel charge, it is necessary to calculate the throttle angle required to achieve the lean air/fuel ratio $\alpha^{ref}$ given the fuel flow previously calculated. As explained above, lean operation is desired for reasons of fuel economy and emission control. Also, we must determine an additional dynamic correction of throttle position to avoid torque disturbances due to moving camshaft timing per the schedule calculated for $\Gamma^{ref}$. The required cylinder airflow is calculated as:

$$\phi_{cyl}^o = (\text{desired fuel charge}) \times (\alpha^{ref}).$$

The values of $\phi_{cyl}^o$ and N are sued to determine from engine mapping data throttle angle $\theta^o$ to provide the desired air flow for lean operation. For the purpose of purging an LNT, the engine must operate with a rich air/fuel ratio, $\alpha^{rich}$. In the same manner $\theta^o$ was determined, a new air flow for rich operation can be determined, along with a required ETC setting for rich operating, $\theta^r$. Thus, the required cam position, $\Gamma^{ref}$ and throttle positions $\theta^o$ and $\theta^r$ are stored as functions $\theta_c$ and N in lookup tables in the memory of controller 14. These lookup tables are used in real time to assure low emissions, good fuel economy, and the driveability of a conventional engine.

To assure that the engine's torque response is close to that of a conventional engine, the steady state schedules described above are not used directly for controlling cam timing, throttle position, and air/fuel ratio. Instead, controller 14 adds a dynamic correction to ETC position and air/fuel ratio command to avoid engine output torque disturbances. The sequence of action of controller 14 may be summarized as follows.

Figure 4:
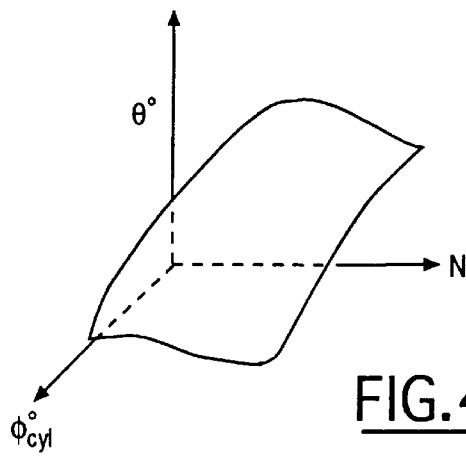
FIG. 4 is a plot of air charge as a function of engine speed and electronic throttle position.

1. The reference camshaft timing position, $\Gamma^{ref}$ obtained from the lookup table illustrated in FIG. 3a is used directly by camshaft phaser 16 to control cam timing. In other words, the camshaft timing command is not filtered. This is true because the response time of camshaft phaser 16 generally slower than the response times of the ETC or fuel injectors.
2. An additional throttle angle, $\theta^*$, needed to compensate for torque disturbance caused by camshaft movement, is computed and added to $\theta^o$, the lean operation throttle setting, obtained from the lookup table illustrated in FIG. 4. The sum of $\theta^o$ and $\theta^*$ is then used to command the ETC to a desired position.
3. Steady-state air/fuel ratio command, $\alpha^{ref}$, is modified to account for the dynamics the intake manifold. The modified value of $\alpha^{ref}$ is then sued to determine the amount of fuel to be delivered by fuel injectors 12.
4. For urging of an LNT, steps 2 and 3 above are repeated for $\theta^r$. Steps 1 and 4 are straightforward to implement; steps 2 and 3 will be explained below.

Figure 5:
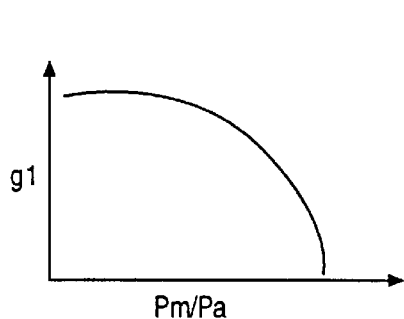
FIG. 5 is a plot of engine air flow as a function of the pressure ratio across the throttle.
Figure 6:
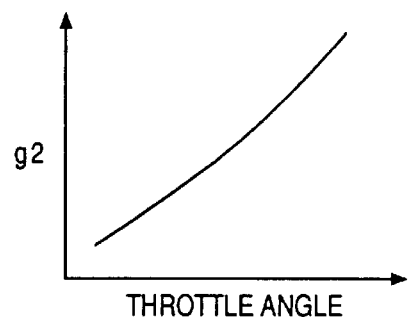
FIG. 6 is a plot of engine air flow as a function of throttle engine.

Controller 14 must calculate an additional throttle angle that when added to the angle calculated above compensates for the torque disturbance caused by moving camshaft to the desired position $\Gamma^{ref}$. This is a dynamic correction which will only be applied while the camshaft phaser 16 is moving the camshaft to a new position. To make this correction, controller 14 needs to know the mass airflow through the throttle body and into the intake manifold. This is a well known function of pressure ratio across the throttle valve and upstream temperature and pressure. Graphically, this may be represented as two or more functions $g_1$, $g_2$. FIGS. 5 and 6 illustrate these functions. FIG. 5 is a plot of engine airflow at standard temperature and pressure as a function of pressure ratio across the throttle, Pm/Pa.

FIG. 6 is a plot of engine airflow at standard temperature and pressure as a function of throttle angle. The flow across the throttle, $\phi_\theta$, equals $g_1 \times g_2$. The flow rate of air from the intake manifold into the engine's cylinders can be represented by an additional function comprising two parameters which are functions of engine speed and camshaft timing position, plus intake manifold pressure $P_m$, which is a measured quantity.

Figure 7A:
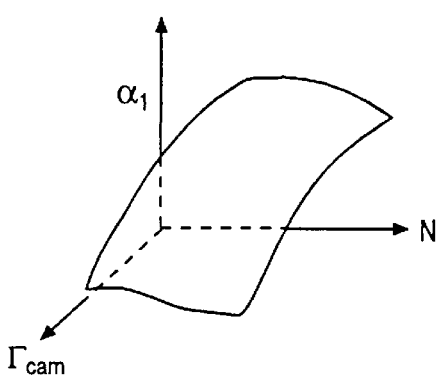
FIGS. 7A and 7B are plots of engine airflow as a function of engine speed and camshaft position.
Figure 7B:
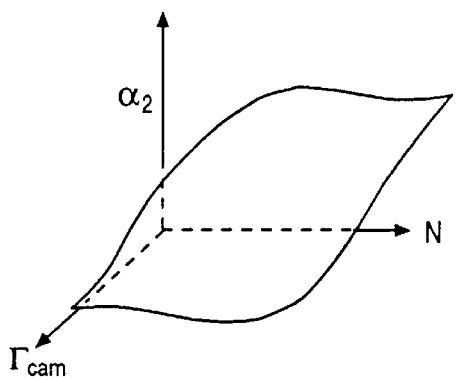

FIGS. 7A and 7B illustrate parameters $\alpha_1$ and $\alpha_2$ which are functions of camshaft position and engine speed. The values of $\alpha_1$ and $\alpha_2$, which are readily available from engine mapping, are stored in lookup tables within controller 14. Flow into the cylinders is calculated as:

$$\phi_{cyl} = \alpha_1 P_m + \alpha_2.$$

Prior to making the final throttle correction, the reference manifold pressure, $P_{mref}$ needs to be known. This is intake manifold pressure corresponding to a stoichiometric fixed cam engine operating at a given engine speed. This may be calculated from the perfect gas law or tabulated.

Figure 8:
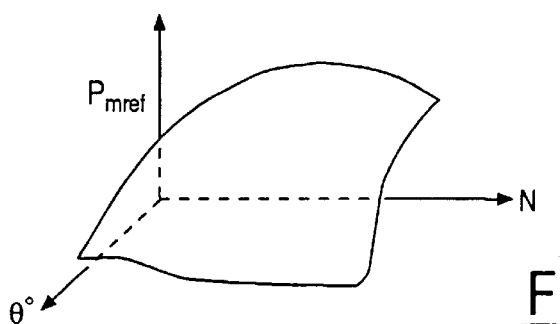
FIG. 8 is a plot of intake manifold reference pressure as a function of throttle angle and engine speed.

FIG. 8 illustrates intake manifold pressure $P_{mref}$ as a function of engine speed N and $\theta^o$. Controller 14 now determines a throttle correction by solving the following equation. Then, the transient throttle correction is $\theta = \theta^o + \theta^*$.

$$\theta^* = (g_2)^{-1}\{[(\partial\alpha_1\partial\Gamma_{cam})P_m + (\partial\alpha_2/\partial\Gamma_{cam})] \cdot [d\Gamma_{cam}/dt]/[k_m g_1(P_m)\alpha_1] + [g_1(P_{mref})/g_1(P_m)]g_2(\theta^o)\} - \theta^o$$

At this point, controller 14 has determined throttle position as $\theta = \theta^o + \theta^*$ for the ETC.

For step 3 above, an additional calculation is required, that is, calculation of the fuel injector pulse width. Because fuel charge can be changed faster than air, a change in fuel charge will cause an undesirable air/fuel transient unless the fuel command is shaped until the air flow catches up. This is accomplished by filtering the air/fuel ratio command to account for the lag. The essential differential equation is given as shown below:

$$de/dt = K_m[g_1(P_{mref})g_2(\theta^o) - g_1(P_{mref} - e)g_2(\theta_c) - \alpha_1(N, O)e]$$

Here, $\alpha_1$ is evaluated without any camshaft advance. Then, the correction factor applied to the air flow command is thus $\Delta\phi_{cyl} = \alpha_1(N,\theta)e$ and $\Gamma_{AF}$ which is the commanded air/fuel ratio compensated for manifold filling dynamics is given by the expression:

$$\Gamma_{AF} = 14.64[1 + \Delta\phi_{cyl}/(\phi cyl - \Delta\phi_{cyl})]$$

In summary, controller 14 calculates $\Gamma^{ref}$, which is camshaft position, $\Gamma_{AF}$ which is the air/fuel ratio accounting for manifold dynamics, and $\theta^*$, the throttle command accounting for camshaft phaser dynamics. During transient operation, the camshaft position, the ETC position, and the air/fuel ratio all change continuously.

While the invention has been shown and described in its preferred embodiments, it will be clear to those skilled in the arts to which it pertains that many changes and modifications may be made thereto without departing from the scope of the invention.

What is claimed is:

1. A method for controlling the camshaft timing, air/fuel ratio, and electronic throttle position in an automotive internal combustion engine, comprising:

determining a camshaft timing advance value for a camshaft which operates cylinder intake and exhaust valves of the engine;

determining a steady-state position for an electronic air throttle;

determining a steady-state air/fuel ratio rate;

determining transient values for electronic air throttle position and air/fuel ratio; and determining a rich air/fuel ratio suitable for purging a lean NOx trap based upon a quantity of fuel suitable for operating the engine at approximately a stoichiometric air/fuel ratio, but with insufficient air, so as to cause enrichment of the air and fuel mixture.

2. A method according to claim 1, wherein steady-state camshaft timing advance and steady-state air/fuel ratio are based upon a sensed operating position of a manually operable accelerator, as well as upon sensed engine speed.

3. A method according to claim 1, wherein the determination of transient electronic throttle position and transient fuel supply rate is based at least in part upon the camshaft timing advance, and upon the steady-state electronic throttle position.

4. A method according to claim 1, wherein transient electronic throttle position is determined as a function of at least the time rate of change of the camshaft timing.

5. A method according to claim 1, wherein transient electronic throttle position is determined as a function of at least the time rate of change of the camshaft timing and the instantaneous pressure within an air inlet manifold of the engine.

6. A method according to claim 1, wherein transient electronic throttle position comprises a steady state value and a correction value.

7. A method according to claim 1, wherein the transient air/fuel ratio is determined so as to track and follow the filling and emptying of the intake manifold with the result that fluctuations in output torque are minimized.

* * * * *